United States Patent [19]

Kawada et al.

[11] Patent Number: 4,977,481
[45] Date of Patent: Dec. 11, 1990

[54] SUPPORTING DEVICE FOR A TRIMMER CONDENSER IN A CONNECTOR OF A PROBE

[75] Inventors: Kazuo Kawada; Yuichi Oiwa, both of Higashi Murayama, Japan

[73] Assignee: Stack Electronics Co., Ltd., Akishima, Japan

[21] Appl. No.: 458,229

[22] Filed: Dec. 28, 1989

[51] Int. Cl.$^5$ .............................................. H01G 5/16
[52] U.S. Cl. .................................................. 361/287
[58] Field of Search ........................................ 361/287

[56] References Cited

U.S. PATENT DOCUMENTS 4,251,849 2/1981 Kawai .............................. 361/287 X Primary Examiner—Donald A. Griffin
Attorney, Agent, or Firm—Lackenbach Siegel Marzullo & Aronson

[57] ABSTRACT

A plate to support an earth terminal of a trimmer condenser constitutes a characteristic feature of a supporting device. One side of a plate is fixed by a screw on a fixing portion higher than the floor of a chamber for an electric parts unit of a frame. On the other side of the plate is formed a leg, the lower end of which is on the floor when the plate is fixed by a screw on the fixing portion. Consequently the plate is supported by the fixing portion and the floor which enables to resist the pressure on the trimmer condenser.

3 Claims, 1 Drawing Sheet

SUPPORTING DEVICE FOR A TRIMMER CONDENSER IN A CONNECTOR OF A PROBE

BACKGROUND OF THE INVENTION

1. Field of the Invention

The present invention relates to a supporting device for a trimmer condenser in a connector of a probe.

2. Prior Art

In these days, a frame to receive an electric parts unit, which comprises a trimmer condenser, a resistance and so on, is in most cases made of zinc rather than brass from economical point of view, because zinc can be transformed in a metal mold. However, zinc is difficult to stick well with solder and it melts at a comparatively low temperature. Accordingly, an earth terminal of a trimmer condenser is difficult to be soldered with a zinc frame. The earth terminal may be pressed on the frame, but the pressed point can not endure frequent adjustments by a screwdriver.

Another method mentioned below has been adopted, too. A hole is cut in a base of a twin-branched plate made of some material which can be soldered. A narrower portion which can fit in the hole is formed at a lower end of an earth terminal of a trimmer condenser. The narrower portion is inserted into the hole, bent near the hole and soldered with the plate. An end of each branch is fixed by a screw on a fixing portion, the top of which is higher than a floor of a chamber in order to avoid said lower end and the solder. Consequently, the base of the plate is positioned above the floor.

The chamber of the frame is covered by a cover. The cover is provided with an inserting hole for a screwdriver in order to adjust an axis of the trimmer condenser. When the axis is rotated by a screwdriver, the plate sometimes inclines as only one side of the plate is supported by the fixing portion. If so, it becomes hard to fit the screwdriver into the head groove of the axis as the axis and the inserting hole do not hold an axial line in common.

It takes time to fix each of the twin-branches by a screw.

It is not economical to use the twin-branched plate.

SUMMARY OF THE INVENTION

One object of this invention is to present a supporting device which will not incline even when the axis of the trimmer condenser is rotated by a screwdriver. In order to achieve this object, the plate has a leg on an end thereof other than the end supported by a fixing portion which reaches a floor of a chamber of the frame.

A trimmer condenser is fixed on the plate as usual, and an end of each branch is fixed on a fixing portion of the chamber of the frame by a fixing screw. An inserting hole for a screw is formed in advance in an end of each branch. In the fixing portion a screwed hole is made for the screw. When the plate is fixed on the fixing portion, the lower end of the leg reaches the floor of the chamber and the plate is supported at both sides thereof.

The chamber of the frame is covered by a cover, and the inserting hole in the cover and the axis of the trimmer condenser hold an axial line in common. Even when the axis is rotated by a screwdriver in order to vary the capacity of the trimmer condenser, the plate will not incline as the plate is supported at both sides thereof and the inserting hole and the axis will be kept on the same axial line.

Another object of this invention is to simplify the operation to fix the plate on the frame. In order to achieve this object, the twin-branches are formed on one end to be supported by a fixing portion and only one branch of the twin-branches is fixed.

Even if only one branch has an inserting hole therein and is fixed on the fixing portion, the plate is strong enough, as one side of the plate is (i.e. the twin-branches are) on the fixing portion and the other side of the plate is supported through the medium of the leg thereof by the floor.

Another object of this invention is to present a supporting device without using a lot of material. In order to achieve this object, the plate has only one branch.

This plate is still strong, as the plate is supported by both the fixing portion and the floor.

DETAILED DESCRIPTION OF THE INVENTION

Figure 1:
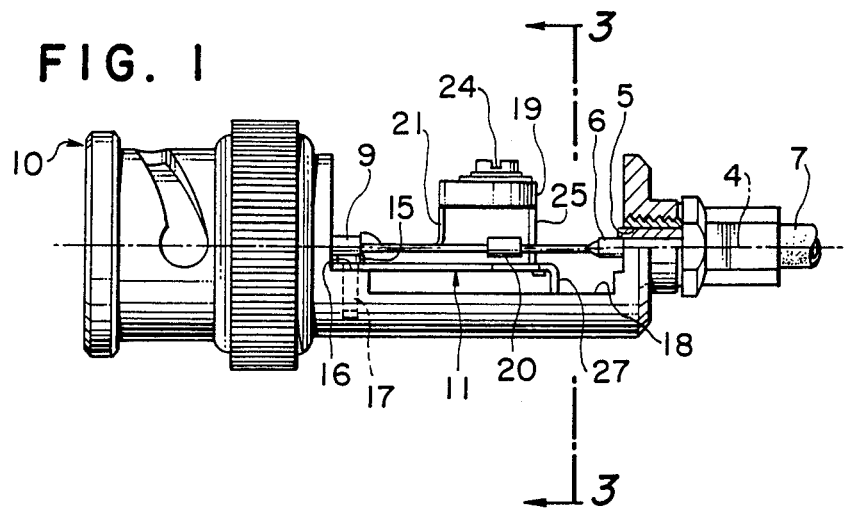
FIG. 1 is a front view showing an embodiment of a supporting device according to the present invention.

In the drawings the same numerals indicate the same or corresponding parts.

A frame 1 is formed by die casting of zinc. The frame 1 comprises a chamber 2 for an electric parts unit 3. One end of the chamber 2 has on an axial line 4 thereof an introductory opening 5 for an inner conductor 6 of a coaxial cable 7. The other end of the chamber 2 has on an axial line thereof an introductory opening 8 for a pin 9 of a rotary connecting portion 10. A plate 11 comprises a pair of branches 12 and 13 on one end thereof. In an end of the branch 12 there is an inserting hole 14 for a fixing screw 15. The plate 11 is fixed on a fixing portion 16 by screwing a screw 15 into a screwed hole 17 in the fixing portion 16 through the inserting hole 14 of the branch 12, with an end of each branch 12, 13 mounted on the fixing portion 16 the top surface of which is higher than the floor 18 of the chamber 2, and the other portion of the plate 11 is kept above the floor 18.

The electric parts unit 3 comprises a trimmer condenser 19 and a resistance 20 as usual. An electric circuit is composed like this: a hot-line 21 of the trimmer condenser 19 is soldered with a terminal 22 of the resistance 20, the other terminal 23 of the resistance 20 is soldered with the inner conductor 6, and the terminal 22 is soldered with a pin 9, too.

A groove 24 is formed in a head of the trimmer condenser 19. A narrower part of the lower end of an earth terminal 25 of the trimmer condenser 19 is inserted into a hole 26 (see FIG. 4) of the plate 11, bent, and soldered with the plate 11.

The plate 11 has a leg 27 on an end thereof other than the end where there are the branches 12 and 13. When the plate 11 is fixed by the fixing screw 15 on the fixing portion 16, the leg 27 is on the floor 18 of the chamber 2.

Figure 2:
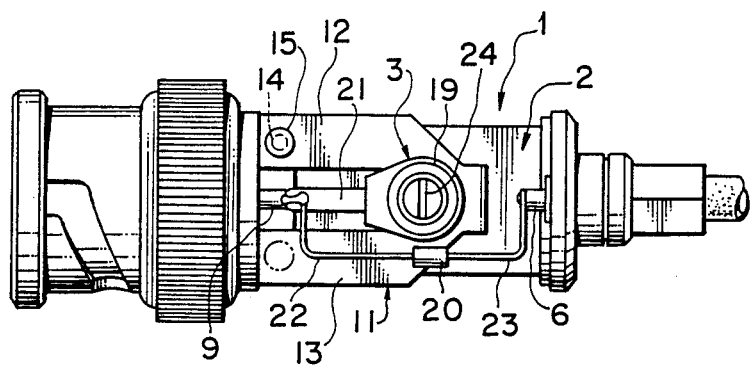
FIG. 2 is a plan view thereof.

The branch 13 may also be provided with an inserting hole 14 through which a fixing screw 15 can, as shown by a chain line in FIG. 2, be screwed into the fixing portion 16.

Figure 4:
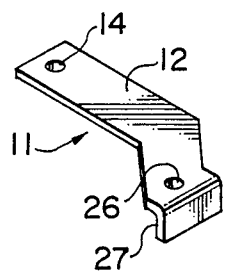
FIG. 4 is an isometric view of another embodiment of a plate.
Figure 3:
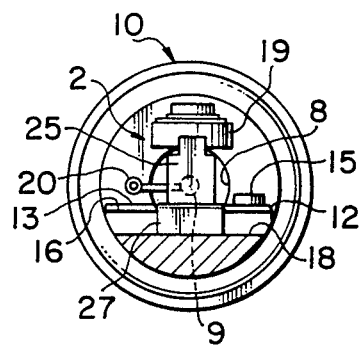
FIG. 3 is a view sectioned along line 3—3 of FIG. 1.

In another embodiment shown in FIG. 4, the plate 11 has only one branch 12.

We claim:

1. A supporting device for a trimmer condenser in a connector of a probe, which comprises a frame, a plate which is supported at one end portion thereof on a fixing portion a top of which is higher than a floor of a chamber for an electric parts unit of the frame and extends above the floor, and a trimmer condenser an earth terminal of which is soldered on said plate, wherein said plate has a leg on the other end portion thereof which reaches said floor.

2. A supporting device for a trimmer condenser in a connector of a probe as claimed in claim 1, wherein said one end portion of the plate forms a pair of branches, only one of said branches being fixed by a screw on said fixing portion, whereby the support of the plate on the fixing portion is done.

3. A supporting device for a trimmer condenser in a connector of a probe as claimed in claim 1, wherein said one end portion of the plate is a form which one of branches is omitted.

* * * * *